United States Patent [19]

Weldin et al.

[11] Patent Number: 4,660,876
[45] Date of Patent: Apr. 28, 1987

[54] REUSABLE BOTTLE HANDLE

[75] Inventors: William B. Weldin, Marietta, Ga.; Raymond C. Lehman, Canton, Ohio

[73] Assignee: Beverage Mate Corp., Akron, Ohio

[21] Appl. No.: 819,596

[22] Filed: Jan. 15, 1986

[51] Int. Cl.4 .............................................. B65D 23/10
[52] U.S. Cl. .................................... 294/33; 294/31.2; 215/100 A
[58] Field of Search ................. 294/33, 27.1, 29, 31.1, 294/31.2, 32, 87.2, 87.28, 99.1, 145, 148, 164, 165, 166; 215/100 A, 100 R, 100.5, 101; 220/94 R, 96; 222/465, 467; 248/145.6, 311.2, 312, 312.1

[56] References Cited

U.S. PATENT DOCUMENTS

| 88,100 | 8/1932 | Lehman | 294/33 |
|---|---|---|---|
| 1,446,474 | 2/1923 | Mahnken | 294/33 |
| 1,464,789 | 8/1923 | Ward | 294/33 |
| 2,075,217 | 3/1937 | Milburn | 294/33 |
| 2,981,562 | 4/1961 | Long | 215/100 A |
| 3,688,936 | 9/1972 | Killigren, Jr. | 215/100 A |
| 3,794,370 | 2/1974 | Lockhard et al. | |
| 4,273,246 | 6/1981 | Thompson | |
| 4,368,826 | 1/1983 | Thompson | |
| 4,379,578 | 4/1983 | Schuler | |
| 4,486,043 | 12/1984 | Rais | |

Primary Examiner—James B. Marbert
Attorney, Agent, or Firm—Nixon & Vanderhye

[57] ABSTRACT

A reusable bottle holder for holding and manipulating a plastic bottle typically for soft drinks such as two and three liter, and proposed, four liter, bottles. The bottle holder has a partial annulus flexible neck locking portion for snap-locking onto the annular neck of the bottle immediately adjacent and below a neck flange. The handle also has an attached partial annulus member attached to it for partially encircling and securing the lower side wall portion of the bottle. While the neck locking portion of the handle is integrally fixed to the handle portion, the lower side wall securing, annular member is fixed to the handle by complementary male and female fittings to facilitate packing and shipping of the handle member.

32 Claims, 13 Drawing Figures

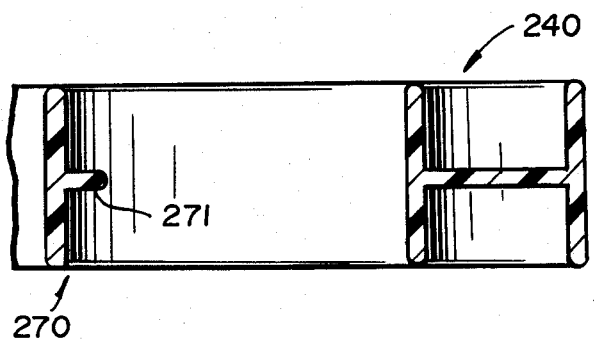
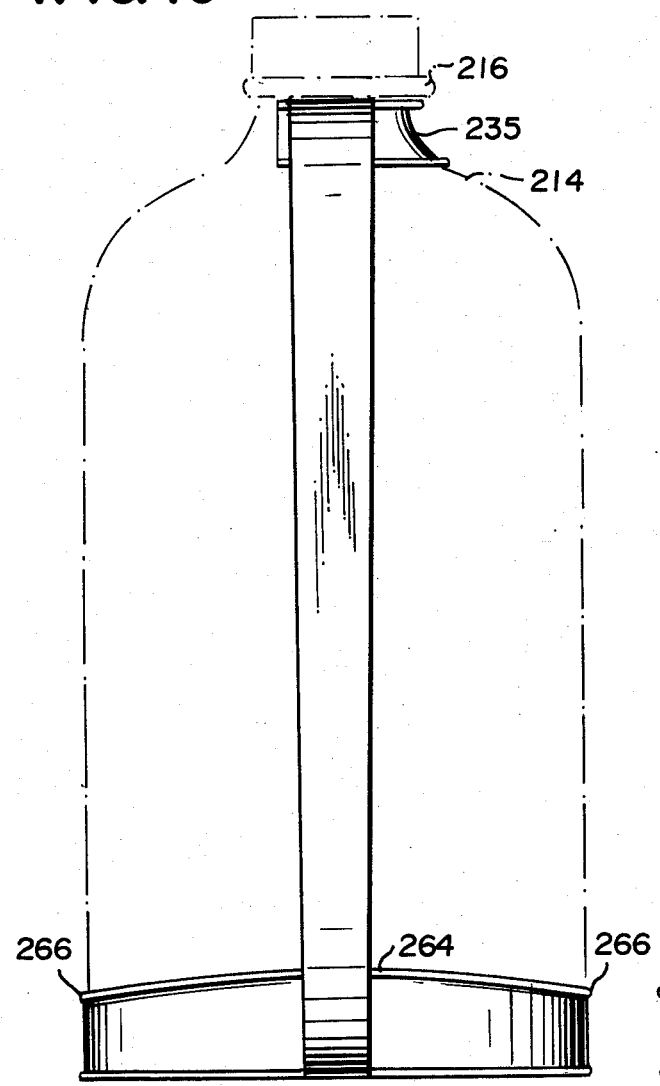
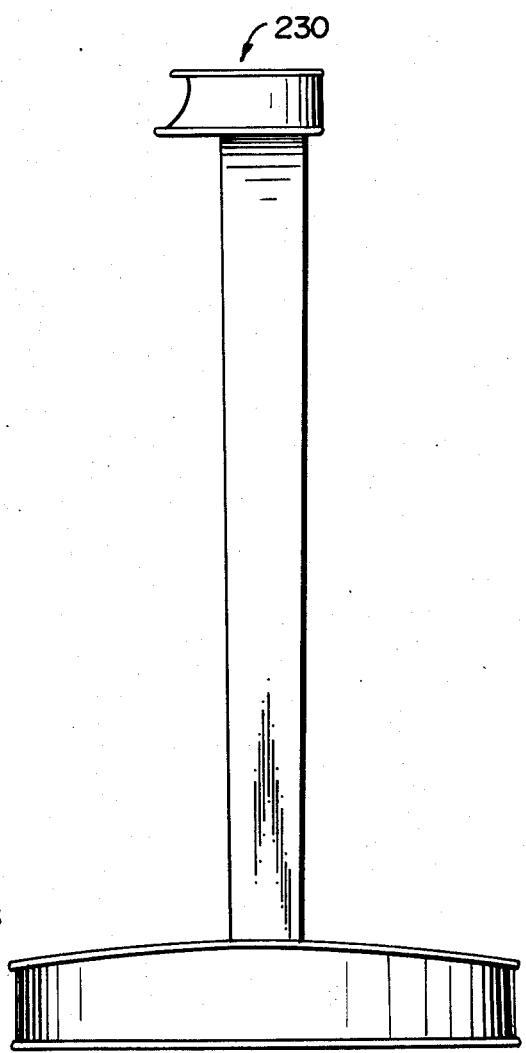

REUSABLE BOTTLE HANDLE

BACKGROUND OF THE INVENTION

This invention is generally directed to holders or carriers for packages or containers, and has particular reference to holders for plastic soft drink bottles.

Soft drink manufacturers have been introducing progressively larger capacity soft drink bottles with corresponding economies of scale. These bottles may be of two or three liter capacity (a four liter capacity is proposed), are made of plastic, and are of a generally large exterior diameter such that handling of the bottles to pour or otherwise manipulate them is somewhat difficult, especially for the elderly or for children. These high capacity bottles typically have a flange like projection from the bottle neck for purposes of strengthening the bottle and perhaps for other reasons.

It has been previously proposed to provide a reuseable handle or reuseable holder for soft drink bottles or the like. Some examples of such prior art are found in the following U.S. patents:

U.S. Pat. No. 547,713, Courtenay, (1895)
U.S. Pat. No. 601,988, Smalley, (1898)
U.S. Pat. No. 622,862, Pierce, (1899)
U.S. Pat. No. 626,262, Wright, (1899)
U.S. Pat. No. 1,446,474, Mahnken, (1923)
U.S. Pat. No. 1,464,789, Ward, (1923)
U.S. Pat. No. 2,075,217, Milburn, (1935)
U.S. Pat. No. 2,308,744, Buys, (1940)
U.S. Pat. No. 3,202,309, Simpson, (1964)
U.S. Pat. No. 3,610,671, Conger, (1971)

BACKGROUND

It is known to provide removable and/or replaceable handles for various kinds of bottles and containers as a holding and manipulating aid. Examples may be found in the following prior U.S. patents:

U.S. Pat. No. 3,688,936, Killigrew, Jr., (1972)
U.S. Pat. No. 3,794,370, Lockhart et al., (1974)
U.S. Pat. No. 4,273,246, Thompson, (1981)
U.S. Pat. No. 4,368,826, Thompson, (1983)
U.S. Pat. No. 4,379,578, Schuler, (1983)
U.S. Pat. No. 4,486,043, Rais, (1984)

Examples of a handle or holder for a multi-liter plastic soft drink bottles are particularly illustrated in Schuler and Rais. However Rais relies upon a prong member physically inserted between the bottle sidewall and a bottom cup while Schuler specifically teaches completely closed annular body support members which may not be sufficiently flexible to conveniently accommodate expected variations in bottle diameter.

The present invention brings an improved and creative and economic approach to the art of providing a reuseable bottle holder particularly suited for aiding the holding and manipulation of larger sized soft drink bottles or the like.

SUMMARY OF THE INVENTION

In accordance with a presently preferred exemplary embodiment, a reuseable bottle holder is used with a bottle having an annular neck flange and an upper portion and a lower enlarged annular side wall portion. The bottle holder has a neck locking portion forming a partial annulus which locks around the annular neck of the bottle immediately adjacent and below a neck flange projection. The neck locking portion has a tapered internal bore for a generally close fit around the neck and shoulder of the bottle, and is flexible so as to snap onto and enclose the neck thus holding it securely.

The exemplary reuseable bottle holder has a lower partially annular member for partially encircling a lower portion of the bottle thus holding the bottle. The lower member is expandable to accomodate fluctuation in the diameter of the bottle side wall.

The exemplary bottle holder also has a handle connected to the neck locking portion and the lower partially annular member. The handle is integrally fixed to the neck locking portion, and fastened to the lower partially annular member by a male-female fitting.

In operation the lower partially annular side securing portion of the bottle holder is placed over the bottle neck and lowered, sliding and pressing along the side of the bottle until the neck locking portion of the bottle holder is proximate the neck and immediately beneath the neck flange. The neck locking portion is then pressed against the bottle neck until the neck locking portion of the holder snaps around the neck immediately below and adjacent to the neck flange. The handle of the bottle holder can then be grasped, enabling manipulation of the bottle. When the bottle is empty the process of attaching the bottle holder to the bottle is reversed thus freeing the bottle holder for reuse.

BRIEF DESCRIPTION OF THE DRAWINGS

Further objects and advantages of the present invention will be better understood by carefully reading the following detailed description of the presently preferred exemplary embodiments of this invention in conjunction with the accompanying drawings, of which:

FIG. 10 is a rear view of the second embodiment;

FIG. 11 is a front view of the second embodiment;

FIG. 13 is a cross section through 13—13 of FIG. 6.

DETAILED DESCRIPTION OF THE PREFERRED EMBODIMENT

Figure 1:
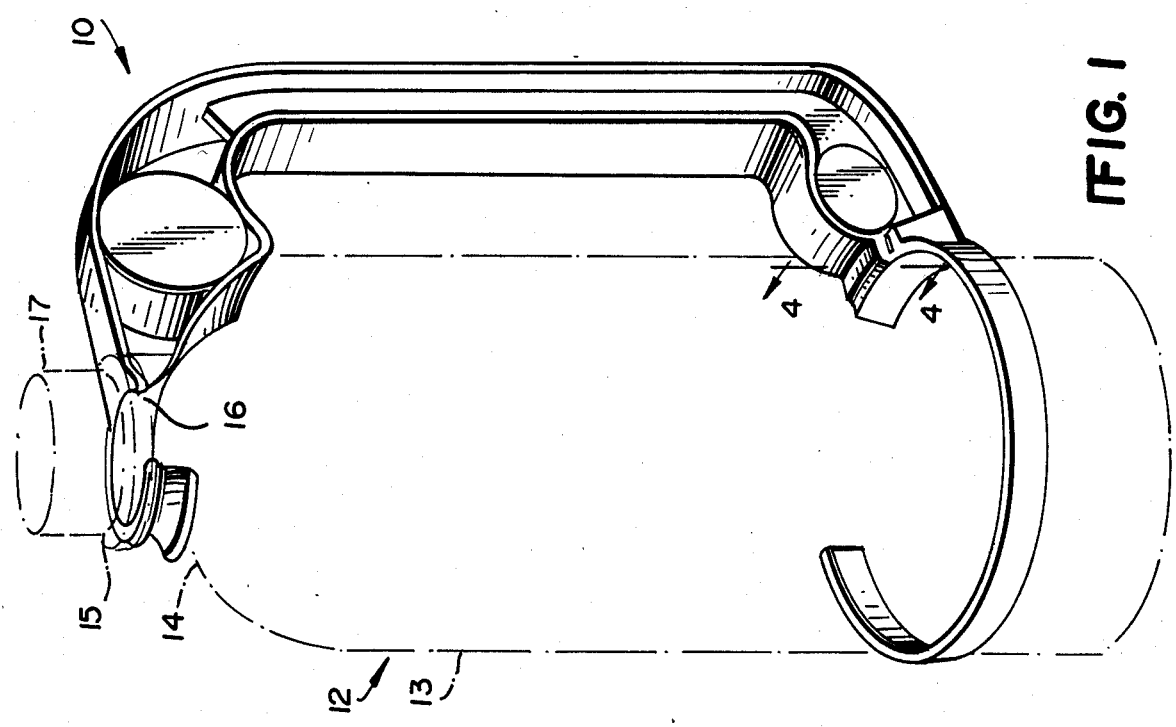
FIG. 1 is an overall view of the reuseable bottle holder according to a first preferred exemplary embodiment.

For the first exemplary embodiment, FIG. 1 shows a reuseable bottle holder while in use holding a bottle 12. The illustrated bottle 12 is a plastic (for example, made of a dense polyethylene, including for example polyethylene terephthalate) soft drink bottle having a fairly large diameter annular side wall 13. The bottle 12 may be of variable capacity including for example, 2,3 or 4 liter volumes. The bottle 12 may be of variable height, but for example, commonly about 13.25 inches for a 3 liter bottle. The side wall 13 may be of variable thickness. The bottle has a neck 14 where the neck 14 is generally of a much smaller diameter than the side wall 13. The side wall is of variable diameter, but commonly about 16.25 inches for a 3 liter bottle. A soft drink bottle of this type usually has a flange like member 15 projecting from the neck 14 immediately below a threaded or capped portion at the terminus of the neck 17 which is of variable diameter, but for example, commonly about 1.5 inches diameter for a 3 liter bottle.

Figure 2:
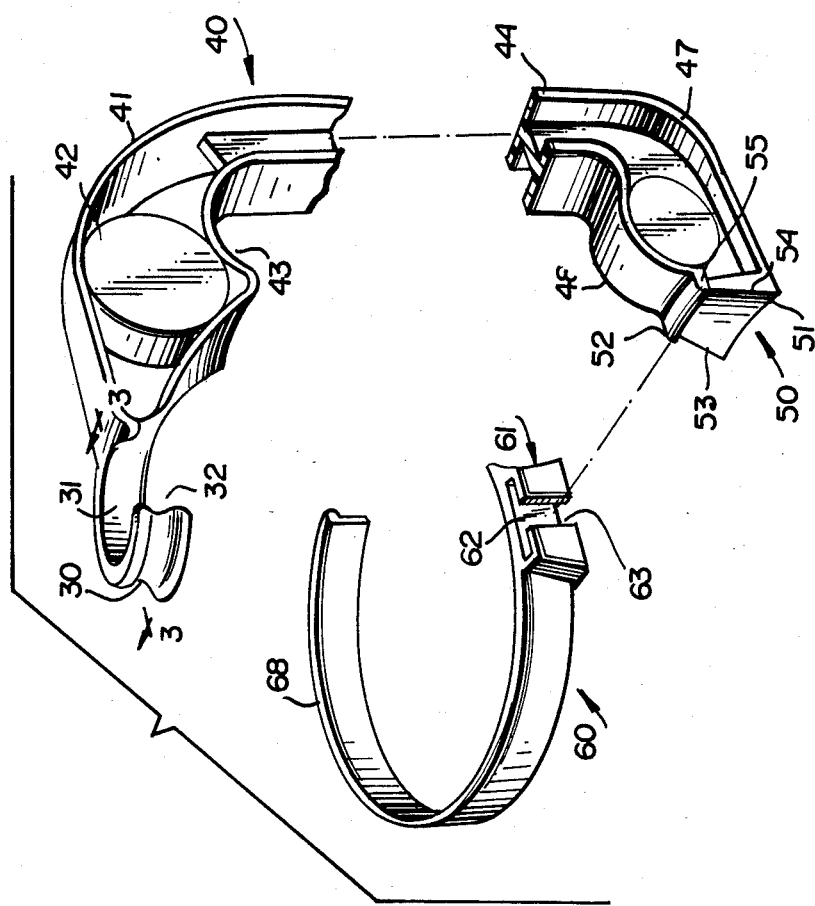
FIG. 2 is an exploded perspective of FIG. 1.

As shown in FIG. 2, the neck locking portion 30 is a partial annular member having a top aperture 31 and a bottom aperture 32. The neck locking means 30 typically encompasses between 270 to 360 degrees closure. Top aperture 31 is slightly greater in diameter than the neck of the bottle 16 but is tapered outwardly and downwardly so that aperture 32 has a greater diameter than aperture 31. The top and bottom aperture 31 and 32 of the neck locking portion 30 are of a size to closely fit the neck portion 16 of the bottle. The handle portion 40 of the bottle holder 10 rigidly (albeit releasably in this two-piece exemplary embodiment) connects the neck locking portion 30 to the side securing portion 60. The upper portion of the handle 40 is reinforced with several structural webs or panels; an outside panel 41, a middle panel or web 42 and an inside panel 43. The webs and/or panels 44-43 provide a characteristic cross-section shape to the handle portion 40, including an "H" shaped cross-section for reinforcement purposes and also for gripping purposes. The handle portion 40 may be of sufficient length to enable a two-handed grip.

The lower portion of the bottle holder handle 40 terminates in a male fitting 50 which fits into a female fitting 61 on the side securing portion 60. The male fitting 50 is attached to the lower portion of the handle 40 by means of an inner reinforcing plate or web 48 and a continuation of the center portion of the handle 44 gradually forming a reinforcing outer plate 47 attached to the lower edge of male fitting 50. The male fitting 50 has the general shape of a wedge wherein the lower portion 51 of the male fitting is broader than the top portion 52 with upwardly and inwardly sloping sides 53 and 54. The top portion 52 of the male fitting 50 is formed into a latching structure 55, which, upon engagement with the female fitting 61, fits snuggly on the top portion of the female fitting.

The female fitting 61 is generally shaped to complement and correspondingly engage the structure of the male fitting 50. The female fitting 61 has a vertical recess 62 formed to engage the male fitting 50 and an axial recess 63 formed to admit and engage the inside lower reinforcing member 48 of the handle 40. The vertical recess 62 of the female fitting 61 is broader at the bottom than the top to complement the broad base 51 and narrow top 52 of the male fitting 50.

The female fitting 61 is fastened to a wide partial annular member 68. The annular member 68 typically encompasses between 270 to 360 degrees closure. The semiannular member 68 forms a partial annulus in a direction opposite to that of the partial annulus formed by the neck locking portion of the bottle holder 30. This opposite closing and holding feature of the bottle holder provided by the neck locking portion 30 and the side securing portion 60, prevents the bottle 12 from slipping and falling out of the bottle holder 10.

Figure 3:
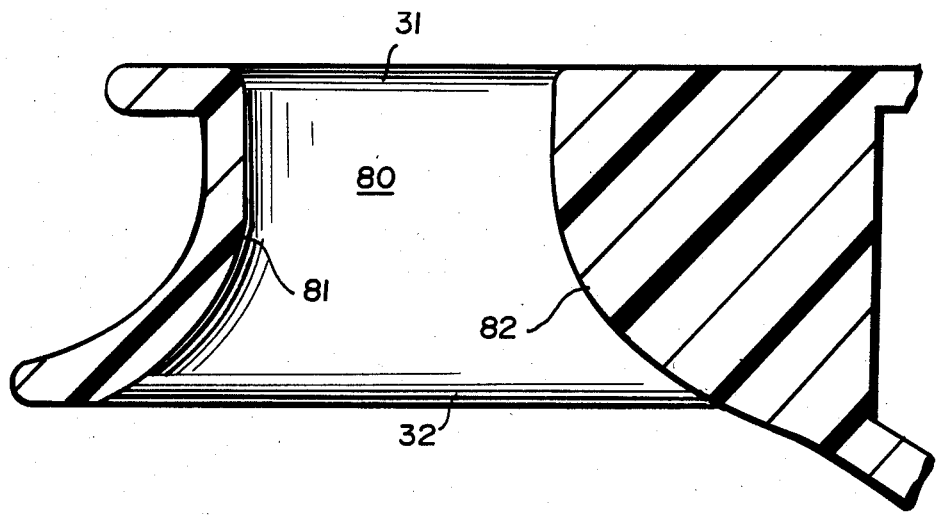
FIG. 3 is a cross section through 3—3 of FIG. 2.

As shown in FIG. 3, the neck locking portion has an inner bore 80 with sides 81 and 82 connecting the top aperture 31 and the bottom aperture 32. The sides 81 and 82 slope downwardly and outwardly to fit the contour of the bottle neck 16.

Figure 4:
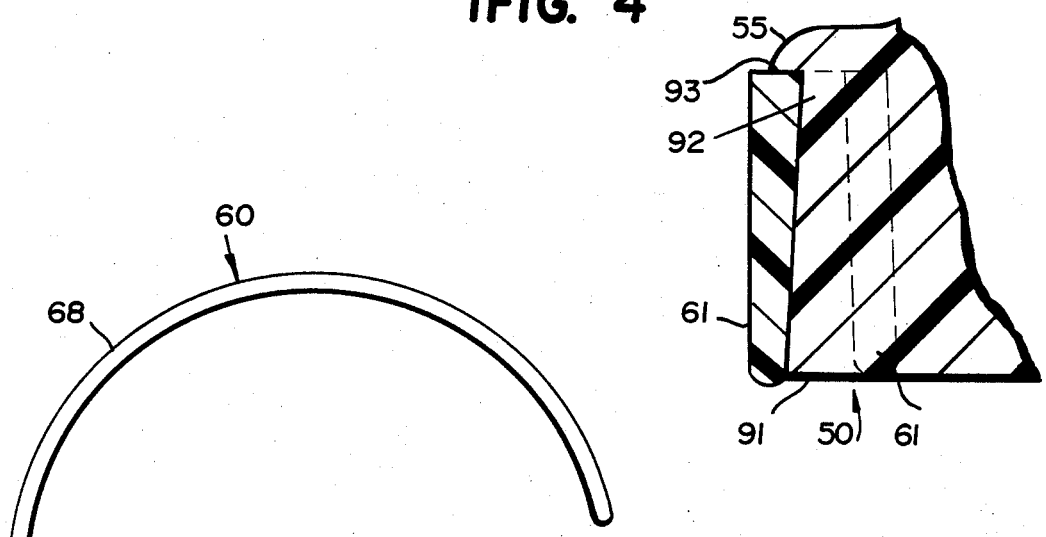
FIG. 4 is a cross section through 4—4 of FIG. 1.

FIG. 4 shows a cross section of the lower portion of the handle 40. The male fitting 50 has a slightly thicker base 91 than the upper portion 92 at the point below the latch portion 55 of the male fitting 50. The latch portion has a horizontal projection 93 which upon engagement of the male fitting 50 with the female fitting 61, fits on top of the inner portion of the female fitting which is formed by part of the partial annular member 68.

Figure 5:
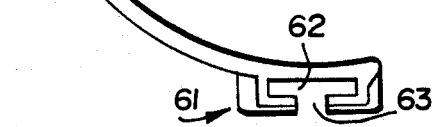
FIG. 5 is a detailed top view of the sidewall securing portion.

As shown in FIG. 5, the partial annular member 68 of the side securing member 60 extends approximately 270 degrees. The top portion of the vertical recess 62 and the axial recess 63 in female fitting 61 are of a shape to correspond and complement with the structure of the male fitting 50 and the inner reinforcing plate 48.

Figure 6:
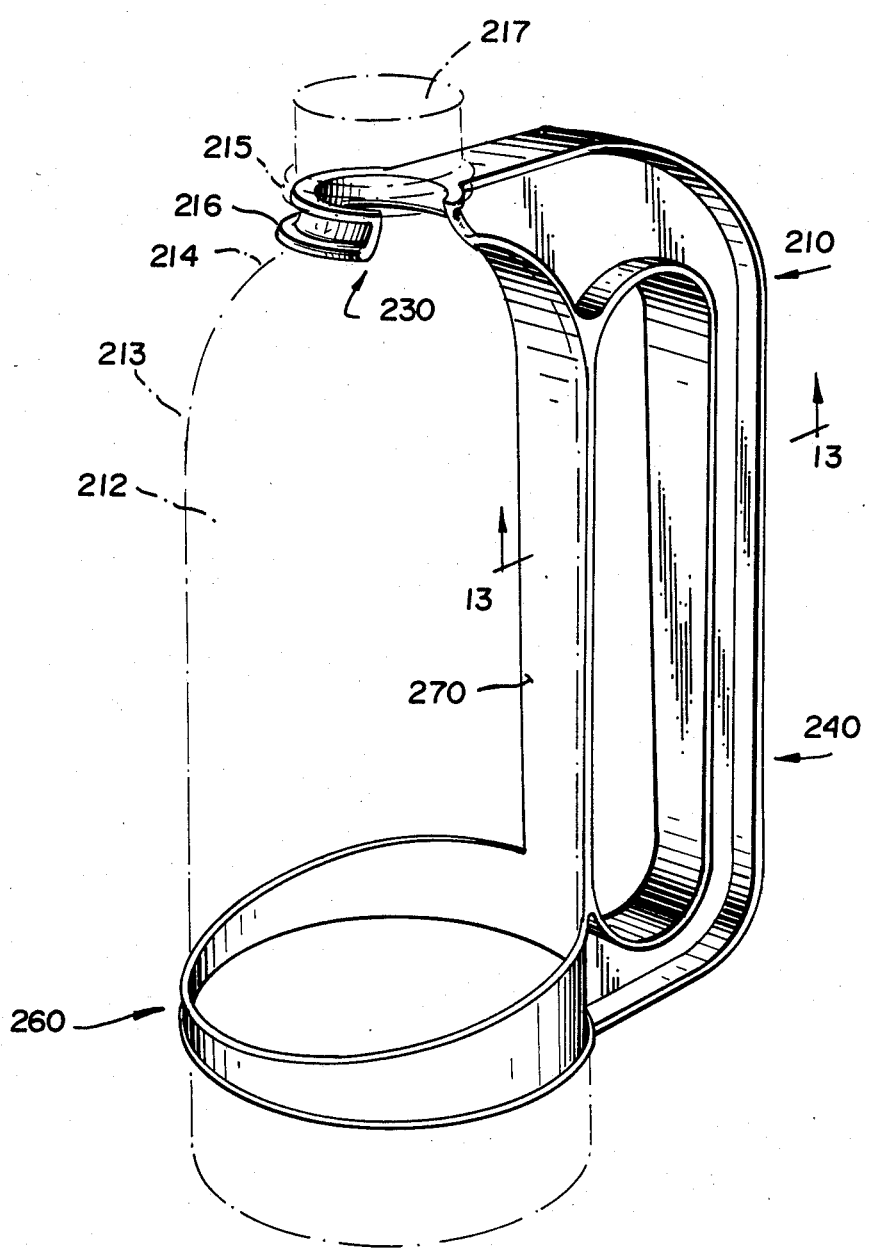
FIG. 6 is an assembled perspective of a second exemplary embodiment of the invention.

For the second exemplary embodiment, FIG. 6 shows a reuseable bottle holder 210 holding a soft drink bottle 212 which has an annular side wall 213 of substantially greater diameter than a neck portion 216. The annular side wall 213 slopes inwardly forming a bottle shoulder 214 of gradually reduced diameter. The neck portion 216 has a flange-like projection 215 from the neck 216 and the neck portion 216 ends in an terminus 217. The bottle holder 210 is shown having a top neck locking portion 230 and a bottom side securing annular member 260, both portions being connected by an inner connecting member 270 which is peripherally attached to a handle 240.

Figure 7:
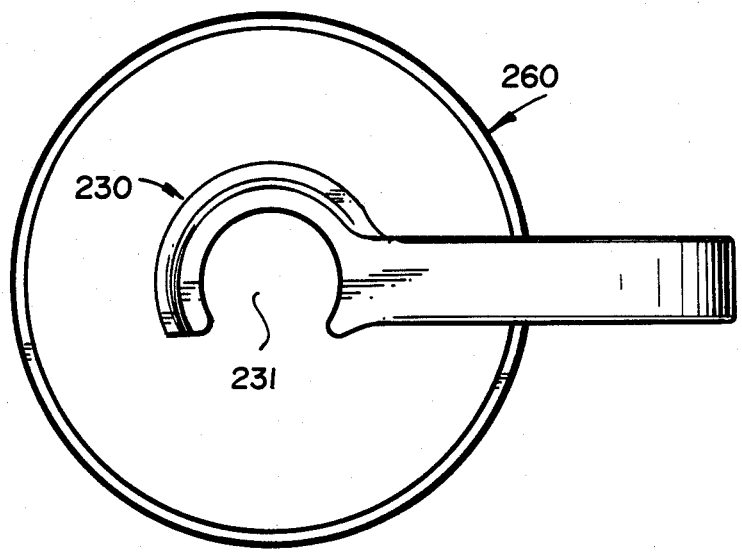
FIG. 7 is a top view of the second embodiment.

As shown in FIG. 7, the neck locking portion 230 forms a partial annulus of about 270 degrees but may extend up to almost 360°. The neck locking portion 230 has a top aperture 231 of a diameter slightly larger than the neck portion 216 of the bottle. The side securing portion 260 is shown to be a complete annulus for slipping onto and about the bottle 210 and side wall 213.

Figure 8:
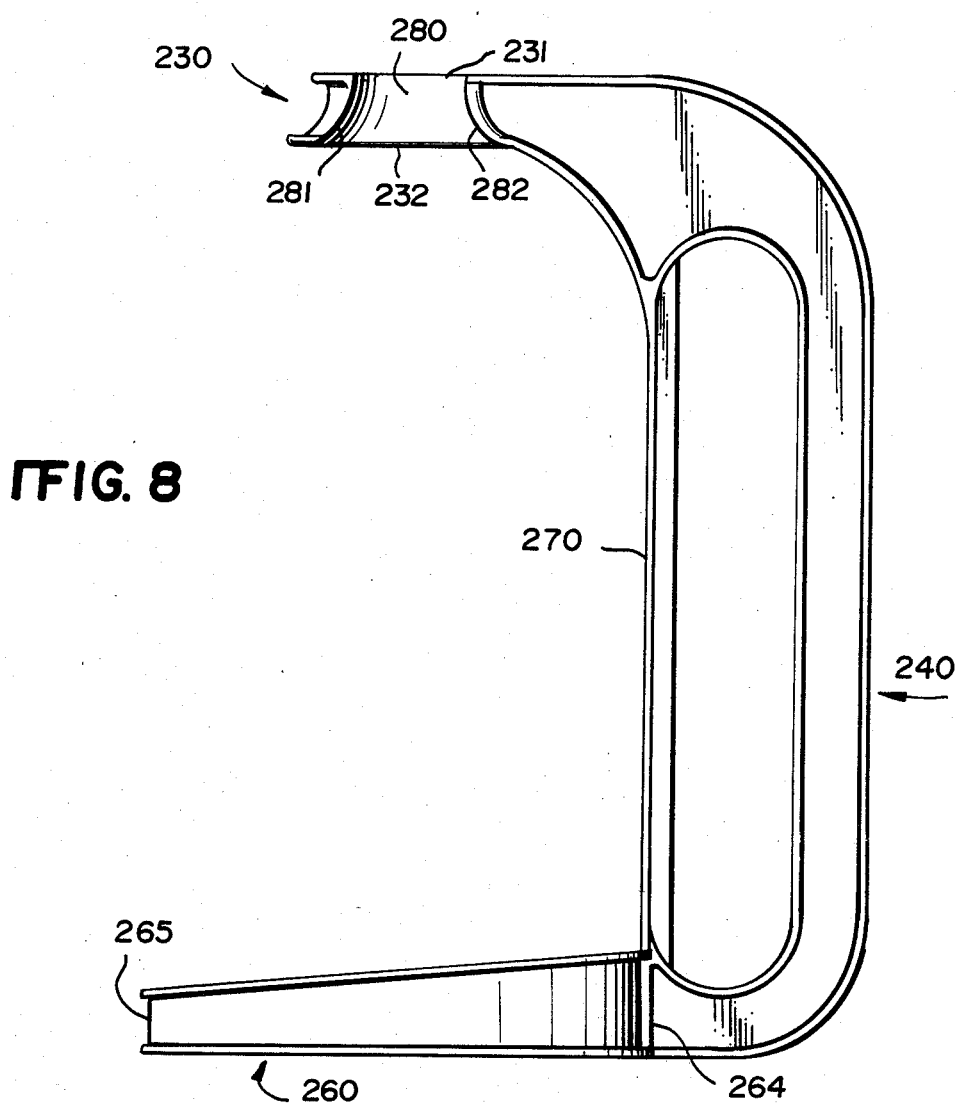
FIG. 8 is a side view of the second embodiment.

As shown in FIG. 8, the neck locking portion 230 has an inner bore 280 with inner sides 281 and 282 and bottom aperture 232. The inner bore 280 of the neck locking portion 230 is shown to taper downwardly and outwardly so as to closely conform to the configuration of the shoulder portion 214 and neck portion 216 of the bottle 212. The inner connecting portion 270 closely conforms to the shoulder portion 214 and side wall 213 of the bottle. The connecting portion 270 is integrally formed with the neck locking portion 230 and the side securing portion 260. The handle 240 is shown to be integrally fastened to the connecting portion 270 and extends for substantially all the length of the bottle holder 210. The side securing portion 260 has a broad portion 264, broader towards the connecting portion 270 of the bottle holder and tapering away from the connecting portion to an outer rim 265.

Figure 9:
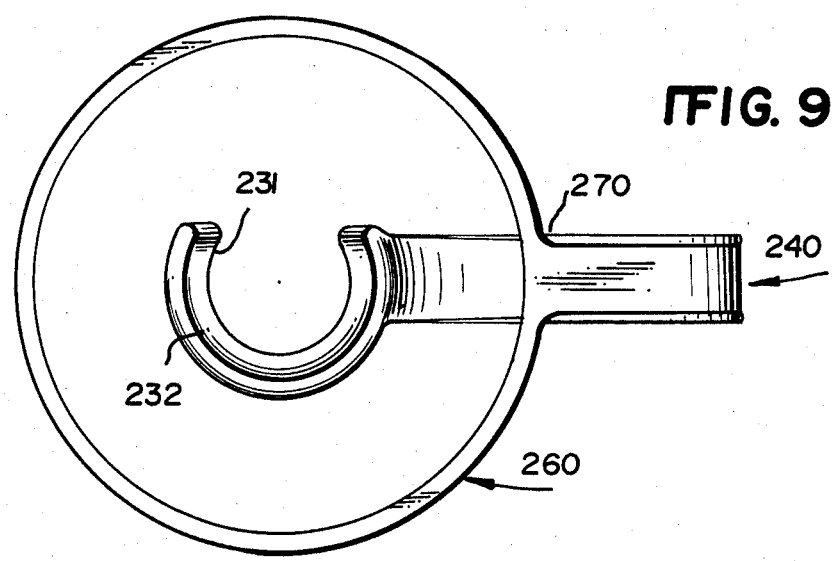
FIG. 9 is a bottom view of the second embodiment.

As shown in FIG. 9, the inner bore 280 of the neck locking portion 230 tapers from the top aperture 231 to the bottom aperture 232. The connecting portion 270 and the handle 240 is shown to be integrally formed with the side securing portion 260.

FIG. 10 shows that the outer surface 235 of the neck locking portion follows the contour of the neck portion 216 and shoulder portion 214 of the bottle 210. The side securing member 260 is shown to gradually taper from the inner fastened portion 264 towards the opposing sides 266.

As shown in FIG. 11, the front of the neck locking portion 230 curves about the front portion of the bottle neck 214.

Figure 12:
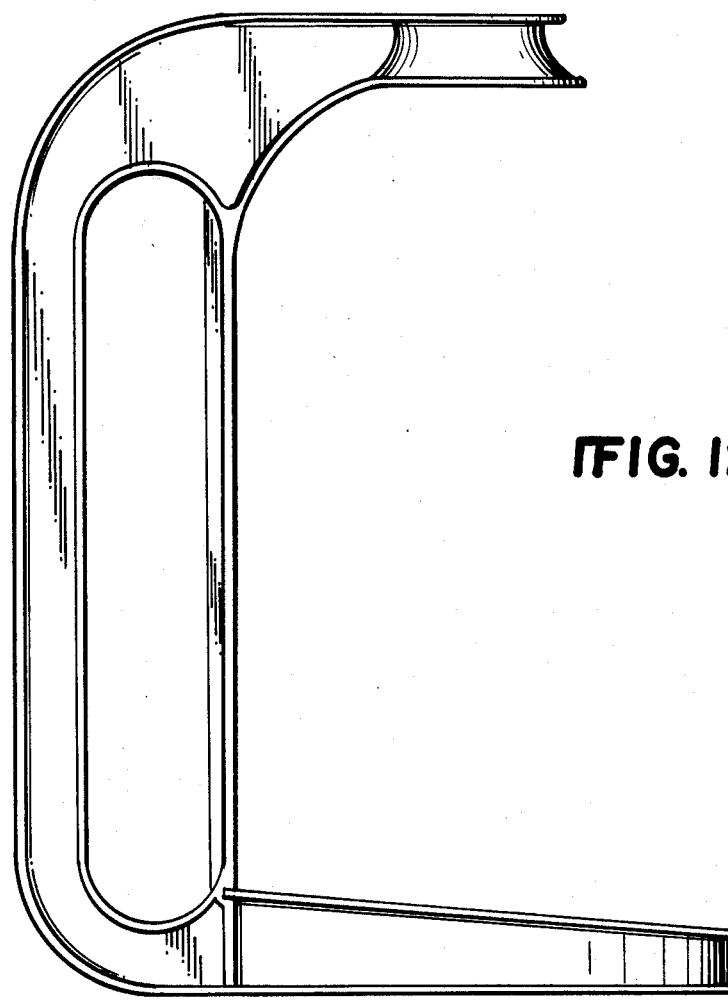
FIG. 12 is a right hand side view of the second embodiment.

FIG. 12 shows a back view of the bottle holder 210.

As shown in FIG. 13, the cross section of the handle 240 is "H" shaped for reinforcement purposes and also for gripping purposes. The connecting portion 270 has a reinforcing member 271 running parallel to its length which parallels the handle 240.

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A reusable bottle holder for use with a bottle having an annular neck flange at an upper portion and a lower enlarged annular sidewall portion, said holder comprising:

neck locking means for locking immediately adjacent and below said neck flange, said locking means forming a partial annulus greater than 180° but less than 360° which has an internal bore, flared outwardly and downwardly away from the terminus of said neck, said neck locking means being flexible so as to snap on by temporary radial expansion and sequential release to securely hold the neck portion of the bottle;

side securing means forming a partial annulus greater than 180° but less than 360° for partially encircling said lower annular sidewall portion of said bottle, said side securing means being expandable to accommodate fluctuation in diameter of said annular sidewall;

said partial annulus of the neck locking means having its opening disposed opposite in direction to that of said partial annulus of the side securing means, and handle means having first and second ends rigidly connecting said neck locking means to said side securing means.

2. A reusable bottle holder as in claim 1 wherein said neck locking means is integrally fixed to said first end and said side securing means comprises a separate part fastened to said second end.

3. A reusable bottle holder as in claim 2 wherein:

said handle means includes a male wedge-shaped fitting located at said second end and in a substantially vertical plane, said fitting having a lower base and extending upwardly to a generally perpendicular protruding portion, and said side securing means including a corresponding female fitting formed as an open-ended slot whereupon, when fully engaging said male fitting, said protruding portion of the male fitting snaps out of an upper end of said female fitting.

4. A reusable bottle holder according to claim 1 wherein said handle means has a length sufficient for a two-handed grip.

5. A reusable bottle holder according to claim 1 wherein said handle means includes generally "H" shaped cross-sectional portions.

6. A reusable bottle holder according to claim 5 wherein said bottle holder is formed from a dense polyethylene.

7. A reusable bottle holder made of polyethylene terephthalate and adapted for use with a three liter soft drink bottle having an upper portion formed as an annular neck with a terminus approximately 1.5 inches in diameter, an annular neck flange projecting from said neck, a lower enlarged annular sidewall approximately 16.25 inches in circumference, and a total height of approximately 13.25 inches, said bottle holder comprising:

neck locking means for locking the annular neck of said soft drink bottle immediately adjacent and below said annular neck flange and forming a partial annulus which has an internal bore, flared outwardly and downwardly away from the terminus of said neck, said neck locking means being flexible so as to snap on by temporary radial expansion and sequential release to securely hold said bottle neck;

side securing means adapted for securing said annular sidewall and forming a partial annular member for partially encircling the lower portion of said bottle, said side securing means being expandable to accommodate fluctuation in diameter of said annular sidewall;

handle means having first and second ends rigidly connecting said neck locking means to said side securing means, said first end of said handle means being integrally formed with said neck locking means and said side securing means being a separate part fastened to said second end of said handle means.

8. A reusable bottle holder as in claim 7 wherein:

said handle means includes a male wedge-shaped fitting located in a substantially vertical plane, said fitting having a lower base and extending upwardly to a generally perpendicular protruding portion, said side securing means including a complementary female fitting formed as an open ended slot where, upon full engagement with said male fitting, said protruding portion snaps out of the upper end of said female fitting.

9. A reusable bottle holder according to claim 7 wherein said neck locking means forms a partial annulus greater than 180° but less than 360°.

10. A reusable bottle holder according to claim 7 wherein said side securing means forms a partial annular member greater than 180° but less than 360°.

11. A reusable bottle holder according to claim 7 wherein said neck locking means forms a partial annulus greater than 180° but less than 360°, and said side securing means forms a partial annular member greater than 180° but less than 360°, wherein said partial annulus has its opening disposed opposite in direction to that of said partial annular member.

12. A reusable bottle holder according to claim 7 wherein said side handle means is of length sufficient for a two-handed grip.

13. A reusable bottle holder according to claim 7 wherein said handle means includes generally "H" shaped cross-sectional portions.

14. A reusable bottle holder according to claim 13 wherein said bottle holder is formed from a dense polyethylene.

15. A soft drink bottle and reusable bottle holder assembly comprising:

a soft drink bottle portion of polyethylene terephthalate with a total height of approximately 13.25 inches, and a capacity of three liters including an upper portion formed as a neck with a terminus approximately 1.5 inches in diameter and an annular neck flange projecting from said neck, and a lower enlarged annular sidewall, approximately 16.25 inches in circumference; and a reusable bottle holder portion including;

neck locking means for locking onto said annular neck immediately adjacent and below said neck flange, said locking means forming a partial annulus which has an internal bore, flared outwardly and downwardly away from the terminus of said neck, said neck locking means being flexible so as to snap on by temporary radial expansion and sequential release to securely hold said neck, side securing means adapted for securing said annular sidewall of said bottle, said securing means forming a partially annular member for partially encircling a lower portion of said bottle, said side securing means being expandable to accommodate fluctuation in diameter of said annular sidewall, and handle means having first and second ends rigidly connecting said neck locking means to said side securing means, said neck locking means being integrally formed with and affixed to said first end and said side securing means being a separate piece fastened to said second end, said handle means and said side securing means including mated wedge-shaped male and female fittings which snap-lock together to form said fastening.

16. A soft drink bottle and reusable bottle holder assembly according to claim 15 wherein said neck locking means forms a partial annulus greater than 180° but less than 360°.

17. A soft drink bottle and reusable bottle holder assembly according to claim 15 wherein said side securing means forms a partial annular member greater than 180° but less than 360°.

18. A soft drink bottle and reusable bottle holder assembly according to claim 15 wherein said neck locking means forms a partial annulus greater than 180° but less than 360°, and said side securing means forms a partial annular member greater than 180° but less than 360°, and said side securing means forms a partial annular member greater than 180° but less than 360°, wherein said partial annulus has an opening disposed generally opposite in direction to an opening of said partial annular member.

19. A soft drink bottle and reusable bottle holder assembly according to claim 15 wherein said handle means is of length sufficient to accommodate a two-handed grip.

20. A soft drink bottle and reusable bottle holder assembly according to claim 15 wherein said handle means comprises generally "H" shaped cross-sectional portions.

21. A soft drink bottle and reusable bottle holder according to claim 20 wherein said bottle holder is formed from a dense polyethylene.

22. A reusable bottle holder adapted for use with a bottle having an annular neck flange at an upper portion and a lower enlarged annular side wall portion, said holder comprising:

neck locking means adapted for locking onto said bottle adjacent and below said neck flange, said locking means forming a partial annulus which has an internal bore, flared outwardly and downwardly, said neck locking means being flexible so as to snap on, by temporary radial expansion to securely hold said neck;

side securing means adapted for securing said side wall and forming a substantially annular member for substantially encircling a lower portion of said bottle;

connecting means permanently connecting said neck locking means to said side securing means and located so as to be substantially immediately adjacent to said side wall along substantially the entire length of the connection means; and handle means fastened to said connection means at the point of its attachment to said side securing means and at the point of its attachment to said neck locking means, so that said handle means extends substantially the entire length of the bottle holder, said handle means being located generally parallel to said connection means but separated therefrom by a predetermined distance.

23. A reusable bottle holder according to claim 22 wherein said neck locking means forms a partial annulus greater than 180° but less than 360°.

24. A reusable bottle holder according to claim 22 wherein all portions of said bottle holder are integrally formed as a one piece structure.

25. A reusable bottle holder according to claim 24 wherein said handle means has a substantially "H" shaped cross-section.

26. A reusable bottle holder according to claim 24 wherein said bottle holder is formed from a dense polyethylene.

27. A reusable bottle holder for use with a bottle having an annular neck flange at an upper portion and a lower enlarged annular sidewall portion, said holder comprising:

neck locking means for engaging an underside of said neck flange, said locking means forming a partial annulus greater than 180° but less than 360°;

side securing means forming a partial annulus greater than 180° but less than 360° for partially encircling said lower annular sidewall portion of said bottle, said partial annulus of the neck locking means having its opening disposed opposite in direction to that of said partial annulus of the side securing means, and handle means having first and second ends connecting said neck locking means to said side securing means.

28. A reusable bottle holder as in claim 27 wherein said neck locking means is integrally fixed to said first end and said side securing means comprises a separate part fastened to said second end.

29. A reusable bottle holder as in claim 27 wherein:

said handle means includes a male wedge-shaped fitting located at said second end and in a substantially vertical plane, said fitting having a lower base and extending upwardly to a generally perpendicular protruding portion, and said side securing means including a corresponding female fitting formed as an open-ended slot whereupon, when fully engaging said male fitting, said protruding portion of the male fitting snaps out of an upper end of said female fitting.

30. A reusable bottle holder according to claim 27 wherein said handle means has a length sufficient for a two-handed grip.

31. A reusable bottle holder according to claim 27 wherein said handle means includes generally "H" shaped cross-sectional portions.

32. A reusable bottle holder according to claim 27 wherein said bottle holder is formed from a dense polyethylene.

* * * * *